Figure 1:
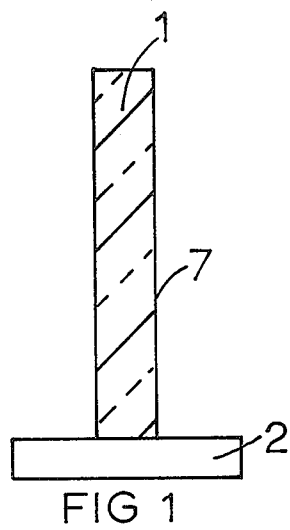

United States Patent [19]

Neefe

[11] Patent Number: 4,472,327

[45] Date of Patent: * Sep. 18, 1984

[54] METHOD OF MAKING HYDROGEL COSMETIC CONTACT LENSES

[76] Inventor: Charles W. Neefe, 811 Scurry St., Box 429, Big Spring, Tex. 79720

[*] Notice: The portion of the term of this patent subsequent to Jul. 14, 2001 has been disclaimed.

[21] Appl. No.: 462,413

[22] Filed: Jan. 31, 1983

[51] Int. Cl.³ .............................................. B29D 11/00
[52] U.S. Cl. ..................................... 264/1.9; 264/1.1; 264/2.7; 351/162; 523/106; 523/122
[58] Field of Search .................. 264/1.1, 1.7, 1.8, 1.9; 8/507; 351/162; 523/106, 122

[56] References Cited

U.S. PATENT DOCUMENTS

| | | | |
|---|---|---|---|
| 2,391,305 | 12/1945 | Galeski | 351/162 |
| 3,034,403 | 5/1962 | Neefe | 351/162 |
| 3,171,869 | 3/1965 | Weinberg | 351/162 |
| 3,454,332 | 7/1969 | Siegel | 264/1.8 |
| 3,712,718 | 1/1973 | LeGrand | 351/162 |
| 3,786,812 | 1/1974 | Neefe | 351/162 |
| 3,941,858 | 3/1976 | Shepherd | 264/1.7 |
| 4,121,885 | 10/1978 | Erickson et al. | 264/1.7 |
| 4,252,421 | 2/1981 | Foley, Jr. | 351/162 |

OTHER PUBLICATIONS

"Evaluation of 'Bacteriostatic' Contact Lenses", Chalkley et al., Am. J. Ophthalmology, vol. 61, No. 5, pp. 866–869, May 1966.

*Primary Examiner*—James Lowe

[57] ABSTRACT

A method of making cosmetic hydrogel contact lenses which alter the apparent color of the iris by employing small light reflecting particles imbedded in a colored transparent matrix.

Cosmetic contact lenses as described herein are of a dual purpose to correct the visual errors and change the apparent color of the eye. The material iris pattern is visible through the lens providing a natural appearance.

3 Claims, 6 Drawing Figures

U.S. Patent   Sep. 18, 1984   4,472,327

METHOD OF MAKING HYDROGEL COSMETIC CONTACT LENSES

PRIOR ART

Several lens types have been produced in an effort to achieve this.

One attempt employed a laminated structure with a painted opaque replica of the iris sandwiched between a clear and usually opaque plastic member. The result was a thick heavy lens which was difficult to fabricate and difficult to wear. A later attempt employed a colored opaque porous member surrounding a clear cylinder from which the lens was cut by lathing. This resulted in a lens having a pupil and iris pattern and the porous member had tendencies to flake and chip at the edge. (U.S. Pat. No. 3,454,332—Siegel). A third generation of colored lenses provided a thin layer of colored opaque markings placed in a clear material. The opaque colored marking radiated from the center of the clear material in a geometric pattern.

The present invention has the following advantages over the previous lenses: The entire lens area is transparent providing peripheral vision and allowing the natural iris pattern to be visible through the lens.

It is commonly known that any transparent conventional colored contact lens placed on a dark colored iris has little or no effect toward changing the apparent color of the eye. We have discovered that if a small amount of a high refractive index finely divided particle such as finely grounded oyster shell, is placed in a matrix of transparent colored lens material of a substantially lower refractive index, the reflected light will have the color of the lower refractive index media. We have also discovered that if a colored transparent central pupil area is provided, the lens will have a natural appearance when in place on the eye and bathed in the tears. As the light entering the transparent colored pupil area will enter the eye and give a dark appearance to the pupil area. Peripheral vision is also undisturbed. The peripheral translucent area transmits from 50 to 90 percent of the light as compared to the transparent central pupil area, therefore, 10 to 50 percent of the available light is reflected by the high index particles and the reflected light has the color of the matrix surrounding the reflecting particles. The macular area is responsible for the visual acuity; however, the peripheral area of the retina is more sensitive to lower levels of illumination. Therefore, any loss of lighting in the peripheral area is not apparent provided the transparent pupil area and translucent peripheral area are the same color. A clear pupil surrounded by a blue periphery will produce a blue color in the peripheral visual fields. This is due to color comparison between central and peripheral fields. This has been a problem with earlier attempts to make cosmetic contact lenses.

Figure 2:
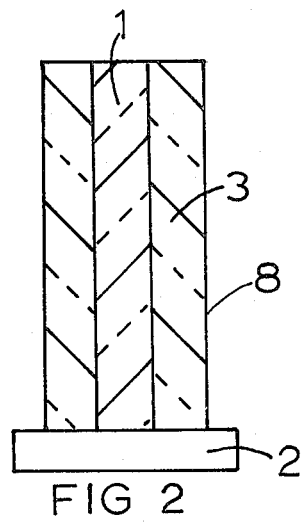
Figure 3:
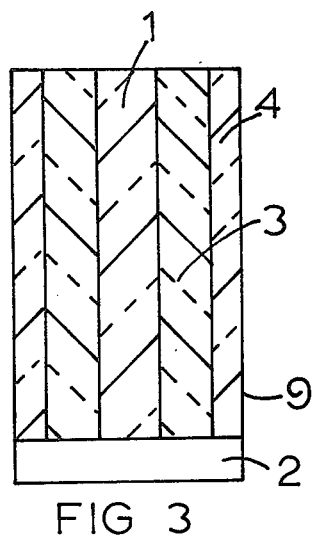
Figure 4:
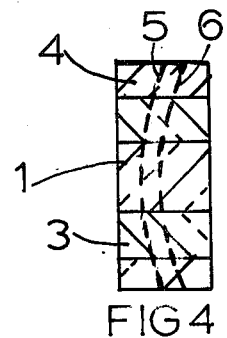
Figure 6:
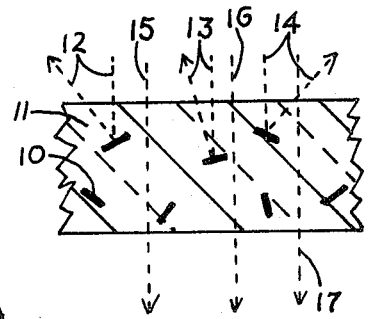
Figure 5:
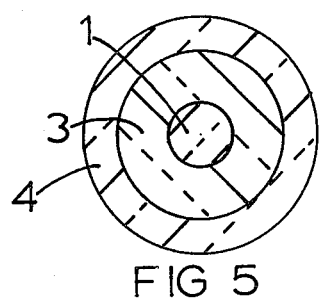

THE LENSES ARE MADE AS FOLLOWS:

Hydrophilic, gas permeable or conventional hard lenses may be made by the following method:

The selected monomeric material, such as hydroxyethylmethacrylate and a suitable catalyst, such as benzoyl peroxide, to achieve polymerization are used. Pigments or a dye of the selected color, such as F.D. and C green Number 6, are added to the monomer before polymerization and cast in the form of a cylindrical rod, 1 FIG. 1, and attached to a centering device, 2 FIG. 1. The centering device if placed in a lathe and the side of the rod, 7 FIG. 1, are trued and smoothed. A polished surface is not required. The centering device is returned to the mold and the reflective iris segment, 3 FIG. 2, is cast around the central transparent rod, 1 FIG. 2. To the monomer and colorant mixture as used for the rod, 1 FIG. 1, light reflecting particles such as mica or finely ground oyster shells is added as light reflecting particles and cast around the center transparent rod to form the translucent segment, 3 FIG. 2. The sides of the semi-transparent cylinder 7 FIG. 2 are trued and smoothed. The peripheral area, 4 FIG. 3, is cast of clear colorless monomer and the sides are also trued and smoothed. Lens blanks are made by cutting discs FIG. 4, from the rod. A lens is made by making two curved sperical cuts from the disc 5 and 6 FIG. 4. The lens, FIG. 5, has a transparent colored pupil area, 1 FIG. 5, a colored semi-transparent light reflecting iris segment 3 FIG. 5, surrounding the transparent colored pupil, 1 FIG. 5 and clear colorless peripheral zone, 4 FIG. 5. In FIG. 6, is shown a greatly enlarged view of the semi-transparent iris color segment, 3 FIG. 5. The light reflecting particles, 10 FIG. 6, reflect one-half the light entering this segment of the lens. The matrix, 11 FIG. 6, is composed of transparent colored polymer whereby the light reflected from the lens 12, 13, and 14 FIG. 6, will have the color of the transparent colored matrix, 11 FIG. 6. The light which does not intersect one of the reflecting particles 15, 16 and 17 FIG. 6, will pass through the lens to illuminate the iris. The iris pattern will then be visible through the lens. The transparent colored central area passes light through the lens and into the eye through the pupil. Any required refractive power is provided to correct the refractive errors the wearer may have. A clear colorless peripheral flange 4 FIG. 5 is provided as the lens is made larger than the iris. Any colored portion of the lens which extends beyond the lymbus would be most distracting and unacceptable.

Antimicrobial agents may be added to the monomer before polymerization and locked into the polymeric structure of the lens. These agents prevent the growth of micro-organisms on the lens surface and eliminate the need for disinfecting. Examples of useful antimicrobial agents are: 3-(trimethoxysilyl) propylocta decyldimethyl ammonium chloride, known as Dow Corning 5700 and hexachlorophene.

Various modifications, of course, can be made without departing from the spirit of this invention or the scope of the appended claims. It is understood thay many variations are obtainable which will yield materials disclosed herein. The constants set forth in this disclosure are given as examples and are in no way final or binding.

I claim:

1. A method of making a cosmetic contact lens blank to alter the apparent color of the eye by the steps of providing a transparent colored cylindrical rod by casting and polymerizing a selected monomer and colorant, truing the sides of the transparent colored rod to form a smooth cylinder, casting a larger semi-transparent cylinder around the first cylinder by adding light reflecting particles to the selected monomer and colorant and polymerizing the monomer to form a second larger cylinder, truing the side of the second cylinder, casting a third larger cylinder around the second cylinder by polymerizing the selected monomer without the colorant or light reflecting particles present, truing the sides of the third cylinder and cutting the cylinder into discs.

2. A method of making a cosmetic contact lens blank as in claim 1 wherein the monomer is hydroxyethyl methacrylate and the reflecting particles are finely ground oyster shells.

3. A cosmetic lens blank made by the method of claim 1 wherein a selected antimicrobial agent is added to the liquid monomer mixture before polymerization.

* * * * *